W. E. HOSCH.
CLOTH MEASURING AND COMPUTING MACHINE.
APPLICATION FILED MAR. 26, 1915.
1,369,663.
Patented Feb. 22, 1921.
5 SHEETS—SHEET 1.
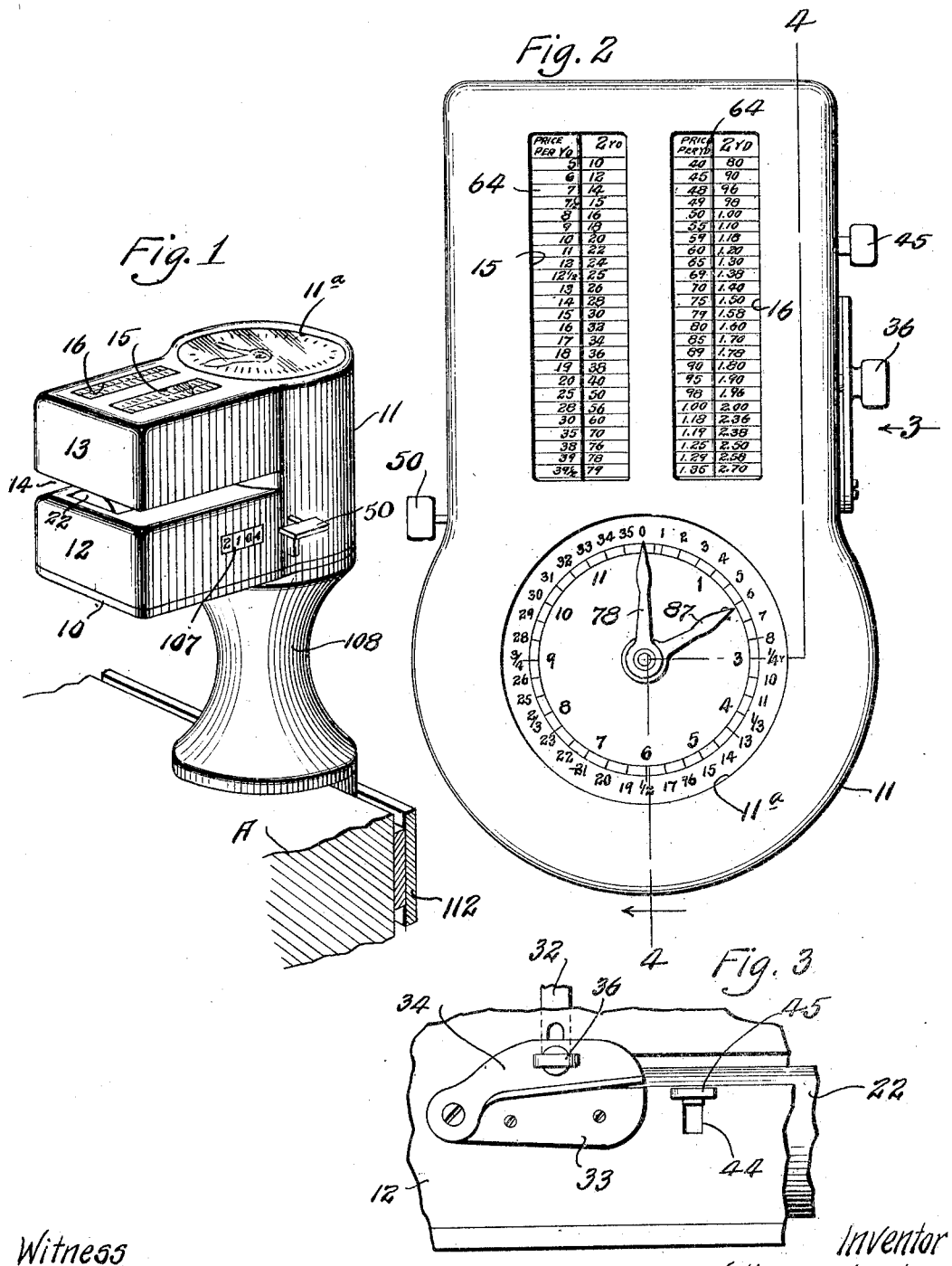
Witness
Wm. Janus
Inventor
Walter E. Hosch
By J.W. Carnwall. Att'y W. E. HOSCH.
CLOTH MEASURING AND COMPUTING MACHINE.
APPLICATION FILED MAR. 26, 1915.
1,369,663.
Patented Feb. 22, 1921.
5 SHEETS—SHEET 2.
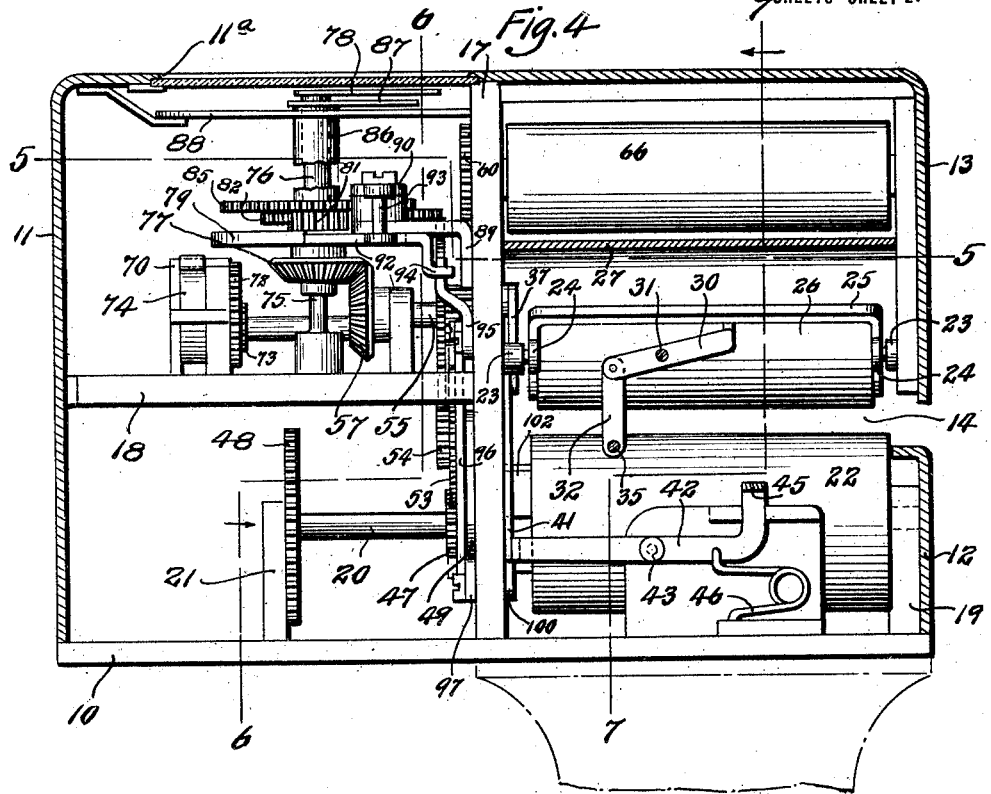
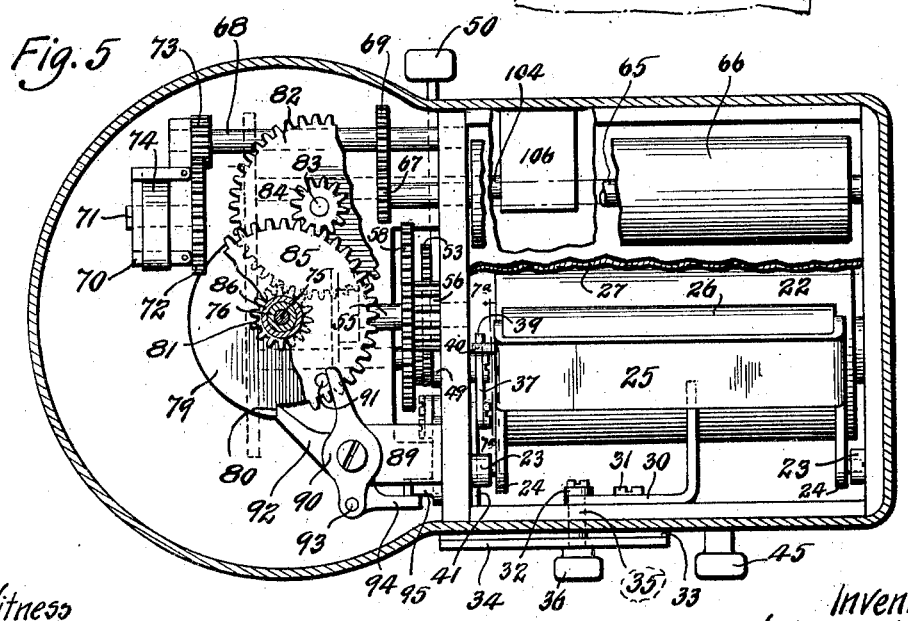
Witness
Wm. Janus
Inventor
Walter E. Hosch
By J. M. Carmudy Atty.

W. E. HOSCH.
CLOTH MEASURING AND COMPUTING MACHINE.
APPLICATION FILED MAR. 26, 1915.
1,369,663.
Patented Feb. 22, 1921.
5 SHEETS—SHEET 3.
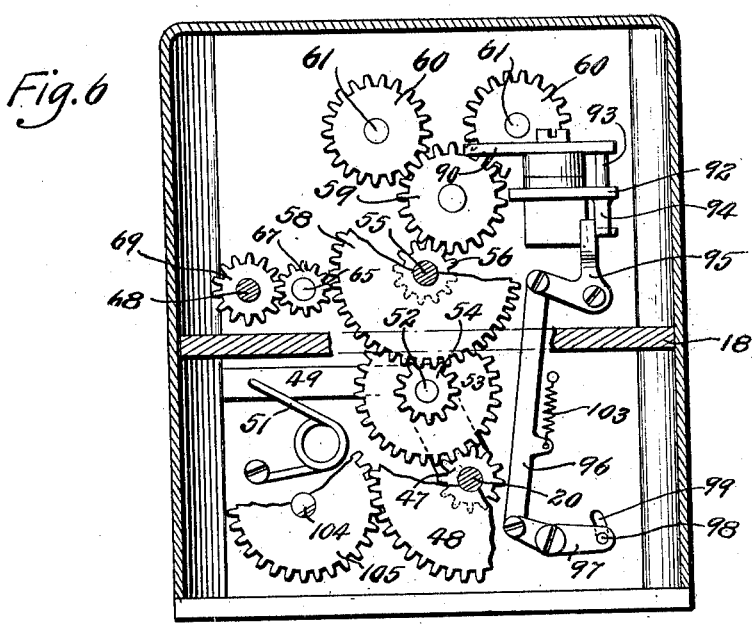
Fig. 6
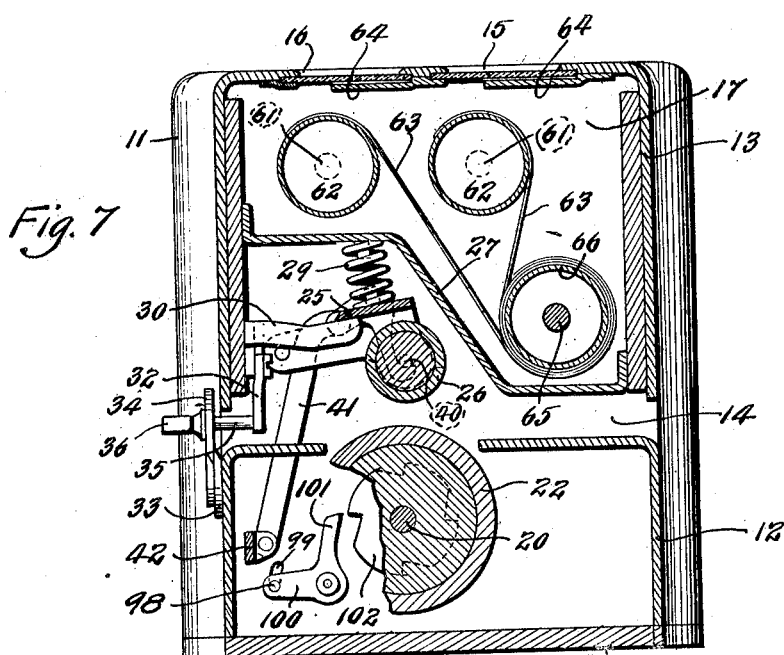
Fig. 7
Fig. 7a
Witness
Wm. Janus
Inventor
Walter E. Hosch W. E. HOSCH.
CLOTH MEASURING AND COMPUTING MACHINE.
APPLICATION FILED MAR. 26, 1915.
1,369,663.
Patented Feb. 22, 1921.
5 SHEETS—SHEET 4.
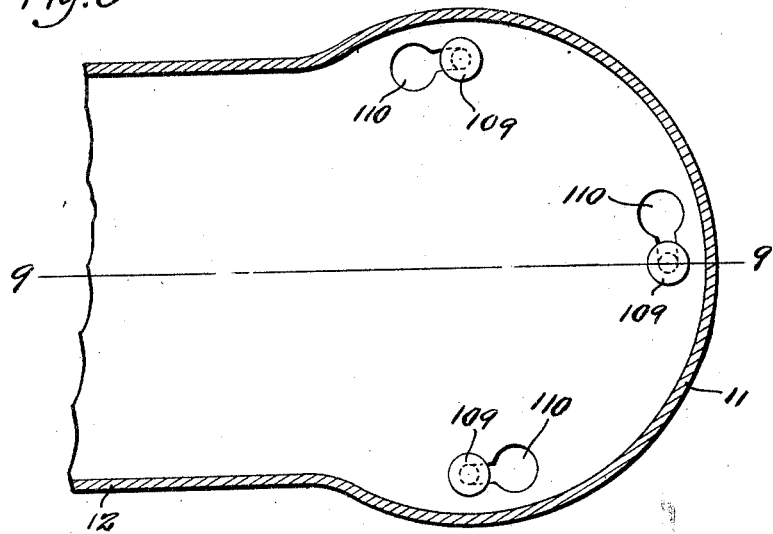
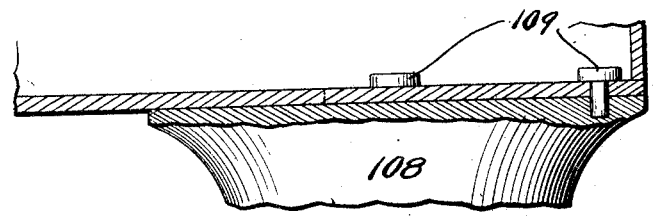
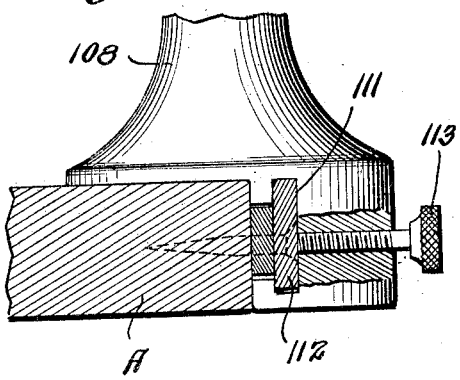 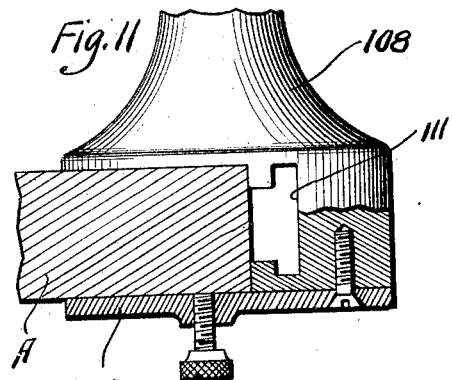
Witness
Wm. James
Inventor
Walter E. Hosch
By J. W. Cornwall, Atty.

W. E. HOSCH.
CLOTH MEASURING AND COMPUTING MACHINE.
APPLICATION FILED MAR. 26, 1915.
1,369,663.
Patented Feb. 22, 1921.
5 SHEETS—SHEET 5.
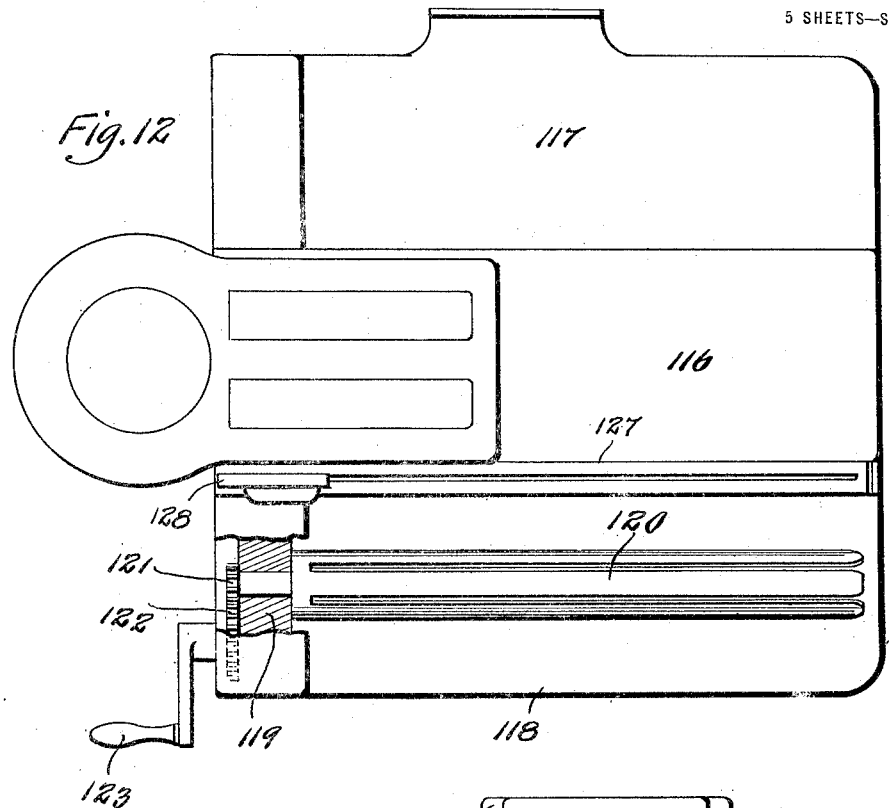
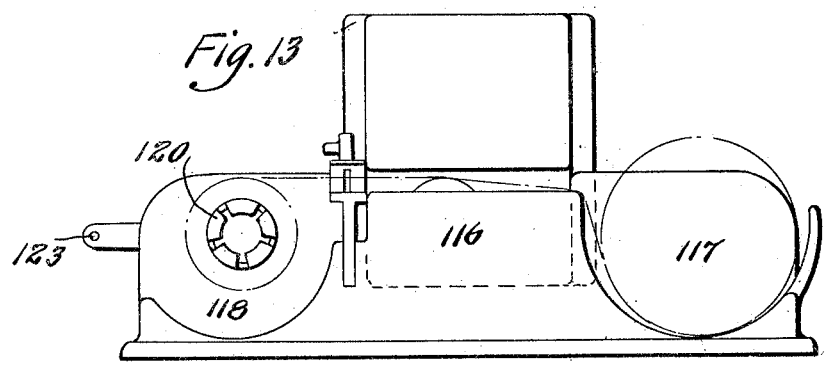
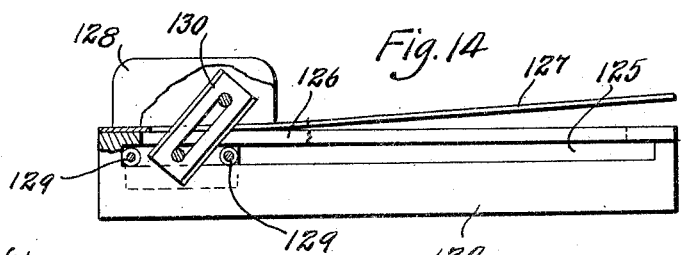
Witness
Wm. Janne
Inventor
Walter E. Hosch
By S. H. Cornwall, Atty.

UNITED STATES PATENT OFFICE.

WALTER E. HOSCH, OF ST. LOUIS, MISSOURI, ASSIGNOR TO THE MEASUREGRAPH COMPANY, OF ST. LOUIS, MISSOURI, A CORPORATION OF MISSOURI.

CLOTH MEASURING AND COMPUTING MACHINE.

1,369,663.   Specification of Letters Patent.   Patented Feb. 22, 1921.

Application filed March 26, 1915. Serial No. 17,154.

*To all whom it may concern:*

Be it known that I, WALTER E. HOSCH, a citizen of the United States, residing at St. Louis, Missouri, have invented a certain new and useful Improvement in Cloth-Measuring and Computing Machines, of which the following is a full, clear, and exact description, such as will enable others skilled in the art to which it appertains to make and use the same, reference being had to the accompanying drawings, forming part of this specification.

My invention relates to new and useful improvements in cloth or fabric measuring and computing machines, the principal object of my invention being to provide a comparatively simple compact machine which can be advantageously used for measuring all kinds of piece goods, and which machine is provided with means which operates automatically as the goods is drawn through the machine for computing the selling price of the measured goods.

The invention relates more particularly to measuring and computing machines, of the general type disclosed in my co-pending application, Serial No. 6954, filed Feb. 8, 1915. In that type of machine, a web or chart is employed which carries tabulated figures. As the rotary member or measuring roller is rotated by the goods this chart or web is advanced past a fixed price scale. The mechanism within the machine included a wheel that completed one revolution at the limit of the indicating capacity of the machine. When this point was reached, a projection on this wheel engaged a stop and arrested the movement of the mechanism. With this arrangement the train of gears from the measuring roller to the stop wheel was subjected to more or less of a shock when the indicating movement was arrested.

The general object of the present invention is to produce a very simple and compact machine having a relatively large indicating capacity; to provide automatic means for directly arresting the rotation of the rotary member or measuring roller at the limit of the indicating capacity of the indicating mechanism, and thereby localize the shock of stopping the movement of the measuring roller and avoid imparting any shock to the more delicate mechanism of the instrument; and to provide improved means for stopping the indicating mechanism in its zero position at the end of the return movement, that is, the movement returning the indicating mechanism to its zero position; also to provide improved means for facilitating the winding off of the goods from the bolt of goods, in the measuring operation.

Another object is to provide improved means for severing the measured cloth.

Further objects of the invention will appear hereinafter.

In the drawings which fully illustrate a preferred embodiment of my invention,—

Figure 1 is a perspective view of a machine of my improved construction, the same being shown in operative position on the edge of a counter or like fixture.

Fig. 2 is a plan view of the machine.

Fig. 3 is an elevational view looking in the direction indicated by the arrow 3 in Fig. 2, and showing the means utilized for marking the edge of the goods at the completion of the measuring operation.

Fig. 4 is a vertical section taken approximately on the line 4—4 of Fig. 2.

Fig. 5 is a horizontal section taken approximately on the line 5—5 of Fig. 4.

Fig. 6 is a vertical section taken approximately on the line 6—6 of Fig. 4.

Fig. 7 is a vertical section taken approximately on the line 7—7 of Fig. 4.

Fig. 7$^a$ is a detail sectional view taken approximately on the line 7$^a$—7$^a$ of Fig. 5.

Fig. 8 is a horizontal section taken through the lower part of the housing of the machine and showing the detachable connections between said housing and the base of the machine.

Fig. 9 is a section taken approximately on the line 9—9 of Fig. 8.

Fig. 10 is a detail elevational view partly in section of the lower end of the base of the machine and showing the means utilized when said base is adjustably applied to the edge of a counter or the like.

Fig. 11 is an elevational view partly in section of the lower end of the base and showing a modified arrangement of attaching said base to a counter.

Fig. 12 is a plan view of the machine applied to a fixture which is specially designed for measuring and rewinding goods such as ribbon.

Fig. 13 is an end elevational view of the machine combined with the ribbon winding fixture.

Fig. 14 is an elevational view partly in section of the severing device utilized in connection with the ribbon winding fixture.

In the construction of the machine as shown, 10 designates a base plate upon which are mounted uprights and brackets which serve as supports and bearings for the operating parts of the machine, and detachably mounted on said base plate is a housing which incloses the operating mechanism. This housing comprises a vertically disposed substantially cylindrical portion 11 which rises from the rear portion of the base plate and projecting forwardly from said housing member 11 is a lower rectangular housing 12 and an upper rectangular housing 13. The housings 12 and 13 are spaced apart to provide a horizontally disposed slot or opening 14 through which the goods passes as it is drawn through the machine.

The top of the housing 11 is provided with a glazed opening 11a and the top of housing 13 is provided with a pair of glazed openings 15 and 16.

Fixed to the central portion of base plate 10 is a vertically disposed partition 17 which divides the chamber within housing 11 from the chambers within the housings 12 and 13, and fixed to this vertical partition and positioned within the chamber in housing 11 is a horizontally disposed partition 18.

Located in the forward end of housing 12 is a bearing 19 and journaled therein is one end of a shaft 20, the same extending through partition 17 and being journaled in a bearing 21 which is located in the lower portion of the chamber within housing 11.

Fixed on shaft 20 within housing 12 is a rotary member in the form of a measuring roller 22, preferably rubber faced and having a circumference of predetermined length, for instance, four and one-half inches which is one-eighth of a yard, or six inches or nine inches, as may be found desirable. The upper portion of this measuring roller projects through the open top of housing 12, thus occupying a position within the horizontally disposed opening 14.

Pivotally mounted in suitable bearings 23 within the lower portion of housing 13 are trunnions which are formed on the ends of a rocking frame, the same comprising end members 24, which are connected by a plate 25 and journaled in said end members 24 beneath said plate is a pressure roller 26, preferably rubber-faced and which is adapted to engage on top of the fabric which is being measured and press the same against the periphery of the measuring roller 22.

An offset plate 27 serves as a bottom for the housing 13 and interposed between this plate and the plate 25 is a compression spring 29, the normal tendency of which is to force the rocking frame and pressure roller 26 downward.

The means for elevating the pressure roller 26 to separate it from the roller 22 after the measuring operation has been completed comprises an angle finger 30, Figs. 4, 5 and 7, one leg of which is pivotally mounted on a pin 31 which is seated in the right hand wall of housing 13 and the outer end of the opposite leg of this finger bears against the underside of plate 25. The end of the pivoted leg of said finger is pivotally connected to the upper end of a link 32.

Fixed on the outer face of the right hand wall of housing 12 and immediately below the opening 14 is a shear blade 33 Fig. 3 to the rear end of which is pivotally connected one end of a shear blade or jaw 34, said blades constituting means for cutting the edge of the material which has been measured in the machine, and the cut thus formed serves as a guide for the salesman in severing the measured goods from the bolt.

The lower end of link 32 is pivotally connected to pivoted jaw 34 by means of a pin 35 which latter operates through a suitable slot in the side wall of housing 13, and the outer end of said pin is provided with a flat head 36 which is adapted to be engaged by the thumb or finger to move blade or jaw 34 downward, thereby effecting the guiding cut in the edge of the goods, and at the same time actuating angle finger 30 to elevate frame carrying pressure roller 26.

The means utilized for maintaining the pressure roller 26 elevated when not in use comprises a bell crank 37 Figs. 4 and 7a, the same being fulcrumed on pin 38 which is seated in partition 17 and the free end of said bell crank is provided with a hook 39 which is adapted to engage beneath a pin 40, the same projecting from the rear end of the pressure roller carrying frame.

The means utilized for actuating the bell crank to disengage the hook from said pin comprises a link 41, the upper end of which is pivotally connected to the short arm of bell crank 37, and the lower end of said link being pivotally connected to one end of a horizontally disposed lever 42 Figs. 4 and 7, the same being fulcrumed at 43 to the right hand side wall of housing 12. The opposite end of this lever is bent outward and extends through a slot 44 Fig. 3 in the right hand side wall of housing 12, and the outer end of said outwardly bent portion is provided with a finger plate 45.

Positioned beneath the end of the lever which projects outward through housing 12 is a compression spring 46. When plate 45 is engaged and moved downward, lever 42 will be moved upon its fulcrum, consequently elevating link 41 and actuating bell crank 37 so as to disengage hook 39 from pin 40, and when said pin is thus freed, the pressure roller 26 will move downward under the influence of spring 29 to engage the goods positioned on top of measuring roller 22.

I shall now describe the driving mechanism for driving the indicating mechanism from the measuring roller, and the means for disconnecting it from the measuring roller to permit the indicating mechanism to be returned to zero.

Fixed on shaft 20 adjacent to partition 17 is a pinion 47 Fig. 4, and fixed on said shaft, adjacent to bearing 21 is a gear wheel 48. Loosely mounted on shaft 20 between pinion 47 and partition 17 is one end of an angular lever 49, the same extending outward through a suitable opening in the left hand side wall of housing 12, and located on the outer end of said lever is a plate 50 whereby said lever may be moved downward.

Engaging the underside of the outer portion of this lever is a compression spring 51 Fig. 6 which normally holds said lever in elevated position.

Seated in lever 49 is a stud 52 on which is loosely mounted a gear wheel 53, the same meshing with pinion 47 and fixed to and carried by gear wheel 53 is a pinion 54.

By depressing plate 50, lever 49 will be rocked to disconnect the driving mechanism through the disengagement of pinion 54 from gear 58.

Journaled in suitable bearings above partition 18 is a short shaft 55 on which is fixed a pinion 56, a beveled pinion 57, and a gear wheel 58, which latter is normally in mesh with pinion 54. Pinion 56 meshes with an idle pinion 59 which is journaled on a stud projecting from partition 17, and said idle pinion meshes with pinions 60, which latter are fixed on the ends of trunnions 61, the same being journaled in partition 17, and being carried by take-up rollers or drums 62 which are arranged for operation in the upper portion of the chamber within housing 13, and which constitute part of the indicating mechanism which I shall now describe. These drums are located beneath the glazed openings 15 and 16 and fixed to and adapted to wind onto said drums are flexible webs or charts 63.

Appearing on the faces of these charts are columns of figures which represent the total amounts or prices to be paid for the goods measured in the machine and the numbers in these rows or columns are spaced so that they will appear directly opposite price per yard figures which are printed on strips 64 Fig. 7 of cardboard or celluloid, and which last mentioned strips are positioned beneath the glazed openings 15 and 16.

I make use of two flexible charts and two price per yard strips in order to materially increase the capacity of the machine without necessitating the provision of an extra long housing, such as would be required to take care of a single long price per yard strip and a corresponding wide single flexible chart.

Journaled in the lower left hand portion of the chamber within housing 13 is a shaft 65, the same carrying a drum 66 on which both flexible charts 63 are adapted to wind at the same point, overlying each other, and one end of this shaft extends through partition 17 and is provided with a pinion 67 Fig. 5.

Journaled in suitable bearings above partition 18 is a shaft 68 Figs. 5 and 6 which carries a pinion 69, the same meshing with pinion 67. Fixed on partition 18 is a suitable framework 70 in which is journaled a shaft 71, the same being provided with a pinion 72 which meshes with a pinion 73, the latter being fixed on shaft 68.

I provide means for returning the indicating mechanism to its zero position. For this purpose, connecting to shaft 71 is the inner end of a spiral spring 74, the outer end thereof being connected to frame 70. This spring 74 acts the same as the main spring of a clock, that is, its tendency is to unwind, and when the unwinding movement takes place as hereinafter more fully described, the driving connections actuated by said spring impart motion to drum 66 so that the greater portion of the charts 63 are unwound from drums 62 and are wound onto said drum 66.

Fixed to and projecting upwardly from partition 18 is a post 75 Fig. 4 on which is loosely mounted a sleeve 76, the lower end of which carries a beveled pinion 77, the same meshing with pinion 57. Fixed to the upper end of sleeve 76 and arranged for operation immediately beneath the glazed opening 14 is a rapidly advancing hand or pointer 78.

This pointer 78 revolves continuously successively around its dial.

I provide a controller wheel which is mounted to make one revolution only in advancing with the indicating mechanism, and which operates to effect the arrest of the rotation of the measuring roller, and also effects the stopping of the returned indicating mechanism at zero. This controller wheel may be driven in any suitable manner but preferably is associated with another wheel that makes successive revolutions, that is to say, one of these wheels makes a partial revolution at each complete revolution of the other. This mechanism is substantially as follows:

Fixed to the lower portion of sleeve 76 and immediately above the pinion 77 is a disk or wheel 79 that moves in unison with the hand 78, and is driven so as to make successive revolutions in an indicating movement, being provided in its edge with a shoulder 80 Fig. 5. Fixed on sleeve 76 immediately above this disk 79 is a pinion 81 which meshes with a larger gear 82 which latter is journaled on a vertically disposed shaft 83 which extends upward from partition 18. Fixed to this large gear 82 is a comparatively small pinion 84 which meshes with a controller wheel in the form of a gear wheel 85, the latter being fixed to the lower end of a sleeve 86, which is loosely mounted on sleeve 76.

The upper end of sleeve 86 which terminates immediately below the upper end of sleeve 76 carries a slow advancing hand or pointer 87, the same being somewhat shorter than the hand or pointer 78, and this pointer makes only one revolution around the dial.

Positioned immediately beneath the glazed opening 11ª and below the horizontal planes occupied by the hands 78 and 87 is a dial plate 88, the face of which bears concentric rows of numerals, the outer one of which is divided into thirty-six equal divisions and being numbered from zero to 35 so as to indicate inches.

The inner row of numbers runs from zero to 11 and are adapted to designate yards. The outer end of hand or pointer 78 traverses a path immediately above the outer row of inch indicating numerals and the outer end of hand or pointer 87 traverses a path immediately above the inner row of yard designating numbers.

The relative sizes of the gears 81, 85, 84, and 82 are such that the hand 78 makes a complete revolution over the dial while the hand 87 moves the distance between two of the numbers on the inner row of yard designating numbers, and the movements of the hands are in every way similar to the movement of the hands of a clock or watch.

I provide suitable means for stopping the indicating mechanism at its zero position in its return movement, but this means is preferably associated with other mechanism as will now be described:

Fixed to partition 17 and projecting outwardly into the chamber within housing 11 above the partition 18 is a bracket 89 on which is pivotally mounted controlling means in the form of a dog 90, one end of which overlies the gear wheel 85 and said overlying end being adapted to engage a dog or pin 91 which is seated in and projects upwardly from said gear wheel 85.

Pivotally mounted with dog 90 on bracket 89, Figs. 5 and 6, is a detent 92, the point of which is adapted to engage a coöperating part or shoulder 80 which is formed in the edge of disk 79, and dog 90 is operatively connected to detent 92 by means of a projection in the form of a pin 93.

Formed on the rear end of detent 92, Figs. 5 and 6, is a finger 94 which normally engages the vertically disposed arm of a bell crank 95, the latter being pivotally mounted on partition 17. Stop mechanism is provided, controlled by this finger for arresting the rotation of the rotary member 22. For this purpose, pivotally connected to the horizontal arm of this bell crank is the upper end of a link 96, the same extending downward through a suitable opening in partition 18, and its lower end being pivotally connected to a short horizontally disposed lever 97. This lever is fulcrumed on the lower portion of partition 17 and seated in the end of said lever opposite to the end which is connected to link 96 is a pin 98 which extends through an arcuate slot 99 in the partition 17. On the opposite side of said partition and within the chamber in housing 12 pin 98, Fig. 7, is seated in the horizontal arm of a bell crank 100, the vertical arm of which is in the form of a pawl or detent 101, the same being adapted to engage in the notches of a ratchet wheel 102, which latter is fixed on shaft 20 at the rear end of measuring roller 22.

Link 96 is normally held at its upper limit of movement by a comparatively small retractile coil spring 103. In other words this spring normally holds detent 101 away from ratchet 102. Journaled in suitable bearings in the lower portion of the chamber within housing 11 is a shaft 104, Fig. 6, the same carrying a gear wheel 105 which meshes with gear wheel 48, and this shaft extends through partition 17 and is directly connected to the operating mechanism or an ordinary total counting device 106, preferably of the type employing a series of disks which are adapted to transfer from one to another, as for instance, units to tens, tens to hundreds, and so on, said counter being located immediately adjacent to the left hand side wall of housing 12 so that the numbered edges of the disk are visible through a glazed opening 107 in said side wall.

It will be understood that my improved machine as herein described can be positioned on a counter or table thereby permitting it to be shifted from one position to another as may be required for use, or it may be rigidly fixed in any suitable manner at a convenient point on the counter.

When it is desired to mount the machine on the edge of a counter, a suitable base is provided, the same being in the form of a standard 108, the top of which engages that portion of the base plate 10 which is beneath the housing 11.

Seated in the top of the standard are headed pins 109 Fig. 8 which are adapted to engage through key-hole openings 110 formed in the base plate 10. By such construction the machine can be easily and quickly applied to or removed from the base or standard 108.

The lower portion of the base is provided with a transversely disposed slot 111 which is adapted to receive a rail 112 which is fixed to the edge of the counter A, and thus the base carrying the machine can be readily shifted along the rail from one end of the counter to the other. A set screw 113 is seated in the lower portion of the base and when tightened is adapted to engage the rail 112 to lock the base at any desired point along said rail.

When it is desired to adjust the base on the edge of a counter which is not provided with the rail 112 a plate 114 is fixed to the lower end of base 108 and seated in said plate is a set screw 115 which is adapted to engage the underside of the counter.

When it is desired to utilize my improved machine for measuring and rewinding ribbon and like goods coming in small bolts, the machine is applied to the end and central portion of a base 116, Fig. 13 the same being provided on one side with a pocket 117 which receives the bolt of goods to be measured, supporting the same from the underside, as in a cradle, that is to say, without supporting the bolt at its axis and on the opposite side of said base is a pocket 118 which receives the goods which has been measured in the machine.

One end of goods holder is mounted for rotation in a bearing 119 at the forward end of pocket 118, said goods holder being in the form of a tube 120 which is slotted longitudinally to provide a series of fingers, and the end of said holder adjacent to the bearing 119 is provided with a pinion 121. Meshing with this pinion is a pinion 122, the same being fixed on a shaft which carries a crank handle 123.

A device for severing the ribbon or goods, measured by the machine when the same is mounted on the base 116, is located adjacent to said machine at the inner side of pocket 118, said device comprising supporting means for the cloth in the form of a rail, along which the knife may be guided. For this purpose I provide a plate 124 Fig. 14 in which is formed a slot 125.

The rail or bar above this slot is provided with a vertically disposed slot 126, and positioned above said slotted bar is cloth holding means constructed to extend over the cloth support. This means is in the form of a strip that tends to hold itself elevated over the cloth. For this purpose I employ a slotted spring 127 attached at one end to the rail.

Guided to move freely over the slotted bar and slotted plate is a carriage comprising a block 128 in which is journaled rollers 129, the same operating in slot 125. Positioned in said block 128 is an inclined blade 130 which extends downward through the slots of the spring 127 and rail.

The operation of my improved machine is as follows:

It will be understood that normally the machine stands with the hands 78 and 87 at the zero point on the face of dial 88, said parts being so positioned and held by the engagement of pin 91 Fig. 5 against dog 90 and the engagement of detent 92 with shoulder 80.

Spring 74 is practically unwound and consequently flexible charts 63 are wound onto drum 66, and consequently blank spaces on the faces of said charts appear immediately beneath the right hand edges of price per yard strips 64.

Pressure roller 26 is maintained in elevated position as seen in Figs. 4 and 7, by the engagement of pin 40 on top of hook 39 Fig. 7ª.

The operator now places one edge of the goods to be measured in slot 14 and brings the end of said goods into alinement with the shear jaws 33 and 34; in doing this the hand which is holding and guiding the loose end comes into alinement with plate 45 which is in alinement with the shears. This hand now moves plate 45 downward, thereby swinging lever 42 Fig. 4 on its fulcrum and elevating link 41 Fig. 7. This movement actuates bell crank 37 and disengages hook 39 from pin 40. As soon as this movement takes place, the power stored in spring 29 throws frame comprising plate 25 and arms 24 downward, thereby causing roller 26 to bear with pressure on top of the goods lying on measuring roller 22.

The operator now manipulates the bolt of goods which is positioned to the left of the machine so as to unwind said goods and at the same time with the right hand pulls the goods through the machine, which movement imparts rotary motion to roller 22, and necessarily as said roller completes a rotation an amount of goods corresponding to the length of the circumference of said roller passes through the machine and is registered on the indicating mechanism.

The salesman by glancing at the hands traversing dial 88 can readily note the amount of goods being drawn through the machine and necessarily the drawing-through operation is terminated when the hands indicate on the dial the amount of goods desired by the purchaser.

As shaft 20 which carries the measuring roller 22 is rotated, corresponding movement will be imparted by means of pinion 47, Fig. 6, to gear wheel 53 and pinion 54 and from the latter to gear wheel 58 and pinion 56, which latter parts are carried by shaft 55.

Motion from pinion 56 is transmitted through idle pinion 59 to pinions 60, which movement simultaneously rotates drums 62, thereby unwinding charts 63 from drum 66, and winding said charts onto said drums 62. As this winding of the charts takes place, the column of figures on the faces of said charts appear in succession beneath the right hand edges of price per yard strips 64, and thus at the completion of the measuring operation, the salesman glances at the figure in the column on the chart which is directly opposite the price at which the goods is to be sold, and thereby ascertains the cost, that is the total amount to be charged for the measured piece of goods.

It will be understood that the various operating parts of the mechanism are of such size as to operate in proper ratio to the movement of measuring roller 22, the circumference of which is of definite length. As shaft 55 is rotated, beveled pinion 57 Fig. 4 will impart movement to beveled pinion 77, which latter is fixed on sleeve 76, and the latter carrying disk 79, pinion 81 and the inch indicating hand or pointer 78.

Pinion 81 drives gear 82 and pinion 84 carried by said gear 82 drives larger gear 85, which latter is fixed on sleeve 86, the latter carrying yard indicating hand or pointer 87. Thus the hands or pointers operating over dial 88 are simultaneously driven during the measuring operation, and by virtue of the relative sizes of the gears between the parts carrying said hands the inch indicating hand 78 makes a complete revolution while the yard indicating hand moves the distance between two of the yard indicating numerals.

As drum 66 rotates during the unwinding of the charts 63, pinion 67 Fig. 5 drives pinion 69, the latter being mounted on shaft 68, and pinion 73 fixed on said shaft drives pinion 72, thereby rotating shaft 71 and winding up and consequently storing power in spring 74.

As shaft 20 is rotated, gear wheel 48 drives gear wheel 105 Fig. 6, which latter is carried by shaft 104 and the latter drives the counting disks within the counter 106, consequently recording the total number of yards measured in the machine.

It is desirable that a machine of this character have a definite capacity, and to this end I have provided means which will automatically stop the various operating parts of the machine when a fixed number of yards have been measured.

It has been demonstrated in practice that a machine having a capacity for measuring twelve yards is ample for all practical purposes in retail trade, and thus I have shown a yard indicating scale numbered from zero to 11 inclusive.

At the beginning of the measuring operation, the hands or pointers are at zero position on the dial and when so positioned pin 91 Fig. 5 bears against the end of dog 90 and detent 92 engages against shoulder 80. Disk 79 in which shoulder 80 is formed makes one revolution with each complete movement of measuring roller 22, and as the movement of said disk 79 is clockwise, the shoulder 80 will at the beginning of operations move away from the point of detent 92.

Likewise, the movement of gear wheel 85 is clockwise, but this movement is slow and corresponds with the movement of yard indicating hand 87. When gear wheel 85 has made a complete revolution which corresponds to the capacity of the machine, namely twelve yards, pin 91 will strike against the rear side of dog 90, thereby swinging the same on its pivot pin and likewise swinging detent 92 so as to cause finger 94 to bear against the vertical arm of bell crank 95 Fig. 6. This movement actuates said bell crank to move link 96 downward, thereby swinging lever 97 on its fulcrum and elevating pin 98. This pin is seated in bell crank 100 Fig. 7 and consequently the latter is actuated so as to cause the pointed end of arm 101 to engage in one of the notches of ratchet wheel 102, and which movement stops measuring wheel 22 from further operation. When this occurs pointer 87 and wheel 85 will have made one revolution.

When pressure roller 26 was released at the beginning of the operations, the downward movement of plate 25 actuated lever 30 to elevate link 32, and consequently pivoted shear jaw 34 Fig. 3 was elevated, and said jaw remains in such elevated position during the drawing through of the goods.

At the completion of the drawing through of the desired amount of goods, the operator, to elevate pressure roller 26, bears downward upon plate 36, Figs. 2 and 7, thereby forcing pivoted shear jaw downward and forming a cut in the edge of the goods, which cut serves as a guide in severing the measured portion of goods from the bolt, and this movement draws link 32 downward, consequently actuating lever 30 and in turn elevating plate 25.

As roller 26 is carried upward with plate 25 pin 40 will bear against the underside of hook 39, and move the same slightly to permit said pin to pass into the hook and thereafter said roller is maintained in its elevated position until the machine is again used.

As roller 26 is elevated, the goods is freed and can be readily removed from the machine.

To bring the hands 78 and 87 back to zero position and likewise reroll the chart 63 on drum 66, the operator engages plate 50, Figs. 2 and 5, and bears downwardly thereupon, thereby actuating lever 49, the same being pivoted on shaft 20, and this movement disengages pinion 54, Figs. 5 and 6, from gear wheel 58. The power stored in spring 74 which was wound up during the measuring operations, will now act to rotate drum 66 anti-clockwise, thereby unwinding the charts 63 from drums 62 and rewinding said charts onto said drum 66. Simultaneously, as drums 62 are thus rotated, rotary motion will be transmitted through pinions 60, 59, and 56 to shaft 55 and from the latter through beveled pinions 57, and 77 to sleeves 76 and 86, and consequently hands 78 and 87 will be brought back to zero position.

In this return movement the shoulder 80 repeatedly passes the pawl or detent 92 but is not stopped by the pawl because the pawl will have been pushed out of its path by the edge of disk 79 in rotating forward. In this connection it should be understood that the spring 103 (see Fig. 6) cannot move the bell-crank lever 95 sufficiently far to the right, as viewed in Fig. 6, to move the detent 92 into the path of the shoulder 80, because the pin 98 engages the lower end of the slot 99 and this limits the movement of the lever 95 in that direction.

To insure the stopping of these hands at the zero point on the dial, pin 91 and dog 90 are utilized and when said pin comes in contact with the end of said dog, detent 92 will be actuated by reason of the pin connection 93 between said dog and detent, and thus the point of said detent will be moved into the path of shoulder 80 on disk 79, so as to engage against shoulder 80 and stop the hands; in this way the various operating parts of the mechanism are properly set for the succeeding measuring operations.

When ribbon or like goods is to be measured, the bolt of goods is placed in pocket 117, Fig. 13, of the base 116, and the end of the goods or ribbon is drawn through the machine and a portion thereof engaged in the slots of tubular holder 120.

The operator now rotates said tubular holder by manipulating crank handle 123, and when the desired amount of goods has been drawn through the machine and measured, said measured portion can be severed by engaging block 128, Fig. 14, and moving the same and blade 130 forwardly over slotted spring 127. The carriage 128 presses the holding strip 127 down onto the cloth and holds it as the edge of blade 130 severs the goods at the proper point, and the severed section of goods can now be removed from holder 120 in a neatly rolled condition.

In case it is desired to measure a piece of goods which has a length greater than the capacity of the machine, the goods can be run through the machine until the hands have registered twelve yards or the capacity of the machine, whereupon the operator depresses plate 50 to actuate lever 49, thereby disengaging pinion 54 from gear wheel 58 and the charts and hands immediately return to zero positions without disturbing the goods positioned between rollers 26 and 22. The remainder of the goods is now drawn through the machine and the total yardage can readily be ascertained.

A cloth measuring and computing machine of my improved construction is comparatively simple, is very compact, can be readily shifted from one point of use to another, can be arranged to slide on the edge of a counter or adjustably positioned thereupon, saves much time and labor in measuring and computing the cost of piece goods, is automatic in operation, is effective in eliminating the cutting off of short and overlength pieces of goods by a salesman, and likewise eliminates mistakes in calculating the total cost of odd lengths of goods at a price per yard which runs into fractions.

It will be readily understood that minor changes in the size, form and construction of the various parts of my improved machine can be made and substituted for those herein shown and described, without departing from the spirit of my invention, the scope of which is set forth in the appended claims.

I claim:

1. In a machine of the class described, the combination with a rotary member mounted so as to be actuated by the movement of the goods thereover, of a dial, a pointer movable over the dial, means for effecting a movement of the pointer corresponding to the movement of the rotary member, a pair of stationary price scales, a pair of webs coöperating respectively with said price scales, and bearing rows of figures indicating cost totals of yards of goods and fractional parts thereof, a drum on which both of said webs are normally wound, and means for imparting simultaneous and corresponding movement to said webs, which movement corresponds to the movement of the rotary member and the said pointer.

2. In a machine of the class described, a main housing, upper and lower housings projecting from said main housing, a dial in the upper portion of the main housing, an index hand movable over said dial, a pair of stationary price scales in the upper housing, webs carried in the upper housing and bearing tabulated numbers and guided so as to move along past said price scales, respectively, a rotary member mounted in the lower housing so as to be actuated by the movement of the goods being measured, means actuated by said rotary member for imparting corresponding movement to the index hand, and means actuated by said rotary member for imparting corresponding movement to said webs.

3. In a machine of the class described, a main housing, upper and lower housings projecting from said main housing, a dial in the upper portion of the main housing, an index hand movable over said dial, a pair of stationary price scales in the upper housing, webs in the upper housings mounted and guided along past said price scales, respectively, a rotary member mounted in the lower housing so as to be actuated by the movement of the goods being measured, means actuated by said rotary member for imparting movement to the index hand, means actuated by said rotary member for imparting movement to the webs, and resilient means for restoring the index hand and the webs to their zero positions.

4. In a machine of the class described, a main housing, upper and lower housings projecting from said main housing, a dial on the upper portion of the main housing, an index hand movable over said dial, a pair of stationary price scales in the upper housing, webs mounted in the upper housing and guided to move along past said price scales, respectively, a rotary member mounted in the lower housing, so as to be actuated by the movement of the goods being measured, means actuated by said rotary member for imparting movement to the index hand, means actuated by said rotary member for imparting movement to said webs, and means for limiting the movement of the rotary member.

5. In a machine of the class described, a main housing, upper and lower housings projecting from said main housing, a dial in the upper portion of the main housing, an index hand movable over said dial, a pair of stationary price scales in the upper housing, webs mounted in the upper housing and guided to move along past the said price scales, respectively, a rotary member mounted in the lower housing so as to be actuated by the movement of the goods being measured, means actuated by said rotary member for imparting movement to the index hand, means actuated by said rotary member for imparting movement to the webs, spring operated means controlled by hand, for restoring the index hand and the webs to their zero positions, and means controlled by the aforesaid mechanism for limiting the movement of the rotary member.

6. In a machine of the class described, a rotary member mounted so as to be actuated by the goods passed through the machine, a pair of rollers mounted for rotary movement in the machine, a drum carrying a plurality of webs normally coiled thereupon and connected to said rollers, respectively, so as to wind upon said rollers when the same are rotated, stationary price scales mounted adjacent to the exposed faces of said webs, and means actuated by the rotary member for simultaneously imparting corresponding rotary movement to said rollers.

7. In a machine of the class described, a rotary member mounted so as to be actuated by the goods passed through the machine, a pressure roller to engage the goods and press the same against the rotary member, a pair of take-up rollers mounted for rotary movement in the machine, a drum, a plurality of webs bearing tabulated numbers normally coiled on said drum and connected with said rollers to wind onto said rollers from said drum, means actuated by the rotary member for simultaneously imparting corresponding rotary movement to said pair of rollers, and stationary price scales adjacent to the exposed faces of said webs.

8. In a machine of the class described, a rotary member mounted so as to be actuated by the goods passed through the machine, a pair of take-up rollers mounted for rotary movement in the machine, a rotatably mounted drum, webs normally coiled on said drum, and connected respectively with said rollers so as to wind onto said rollers from said drum, means actuated by the rotary member for simultaneously imparting corresponding rotary movement to said pair of rollers, stationary price scales adjacent to the exposed faces of the webs, and means connected to said drum for imparting movement thereto to rewind the webs thereupon.

9. In a machine of the class described, a rotary member mounted so as to be actuated by goods passing over the periphery thereof, indicating means actuated thereby to indicate the amount of peripheral movement of said rotary member, a drum carrying a plurality of indicating webs with tabulated numbers, a plurality of rollers upon which said webs respectively wind from said drums, and price scales adjacent to said webs, and having numbers in alinement with the numbers on said webs for indicating the price of goods measured by said machine.

10. In a machine of the class described, a rotary member mounted so as to be actuated by goods passed through the machine, means operated by said rotary member for registering the movement thereof, a pair of price scales arranged side by side above the rotary member, a pair of rollers, means actuated by said rotary member for simultaneously rotating said rollers, webs adapted to wind onto said rollers, a drum on which said webs are normally wound, and means for rotating said drum to rewind said webs thereupon from said rollers.

11. In a machine of the class described, the combination of a rotary member adapted to be actuated by goods passed through the machine, indicating means including a pointer actuated by said rotary member for registering the movement thereof, a pair of price scales arranged side by side above the rotary member, a take-up roller corresponding to each of said price scales, means actuated by said rotary member for simultaneously rotating said take-up rollers, webs adapted to wind onto said take-up rollers when rotated, a drum on which said webs are normally wound, a spring coöperating with said drum for rotating the same to rewind the webs thereupon, and for returning the said pointer to its zero position, and an automatically operating stop for arresting the movement of the rotary member.

12. In a machine of the class described, a rotary member adapted to be actuated by goods passed through the machine, a dial, index hands movable over said dial, means actuated by the rotary member for effecting the advance of the hands corresponding to the movement of said rotary member, a pair of stationary price scales positioned adjacent to said dial, webs bearing numbers to coöperate, respectively with said price scales, means for driving said webs from the rotary member, said webs operating in conjunction with the said index hands, spring actuated means for restoring the index hands and the webs to their zero position, manually operated means for permitting the spring-actuated means to act and means for stopping said webs and index hands when the same reach their zero position.

13. In a machine of the class described, a main housing, upper and lower housings projecting from said main housing, a dial in the upper portion of the main housing, an index hand movable over said dial, a pair of stationary price scales in the upper housing, webs in the upper housing adapted to coöperate respectively with the price scales, a rotary member mounted in the lower housing and adapted to be actuated by the movement of the goods to be measured, means actuated by said rotary member including a part for imparting corresponding movement to the index hand and another part for simultaneously giving corresponding movements to the webs, spring actuated means for restoring the index hand and the webs to their zero position, including a manually releasable member for controlling the restoring of the same to the zero position, automatic means for arresting the movement of the rotary member at the limit of movement of said hand, and automatically operating means for stopping the index hand and the webs in their zero position when returned thereto, by said spring actuated means.

14. In a machine of the class described, a rotary member mounted so as to be actuated by goods passed through the machine, means operated by said rotary member for registering the movement thereof, a pair of stationary price scales, a take-up roller corresponding to each of said price scales, a web windable onto and from each of said take-up rollers, a drum on which said webs are normally wound, and means operated by the rotary member for simultaneously rotating the said rollers in a direction to wind the webs thereupon.

15. In a machine of the class described, the combination of a rotary member mounted so as to be actuated by goods passed through the machine, means operated by said rotary member for indicating the movement thereof, a pair of price scales disposed side by side above the rotary member, a pair of rollers mounted adjacent to said price scales, respectively, means actuated by said rotary member for simultaneously operating said rollers, a rotatably mounted drum, number bearing webs normally coiled on said drum and connected respectively with said rollers to wind onto said rollers from said drum, and a spring coöperating with said drum for rotating the same to rewind the webs thereupon, said spring being mounted so as to be wound by the unwinding of the webs from said drum, and manually operated means for enabling said spring to rotate said drum in the rewinding direction.

16. In a machine of the class described, the combination of a rotary member mounted so as to be actuated by goods passed through the machine, a pair of price scales, a pair of rollers associated with said price scales respectively, means actuated by said rotary member for simultaneously rotating said rollers, a rotatably mounted drum, number-bearing webs normally coiled on said drum, the coils of said webs overlying each other at the same point on said drum, said webs connecting respectively with said rollers so as to wind onto said rollers from said drum, and means for rotating said drum after the indicating operation to rewind said webs thereupon.

17. In a machine of the class described, the combination of a rotary member mounted so as to be actuated by goods passed through the machine, an indicating device having a rapidly advancing pointer and a slow advancing pointer, a rotating part carrying a projection and constructed to rotate with said slowly advancing pointer, a second rotating part having a shoulder thereupon and constructed to rotate with said rapidly advancing pointer, a dial coöperating with said pointers, means for driving said pointers from said rotary member, and a dog projecting into the path of said projection so as to be engaged by said projection when said slowly advancing pointer has made one revolution, means for returning said pointers to their zero position, and a detent normally held out of the path of said shoulder and constructed to be moved by said dog into the path of said shoulder when said projection engages said dog at the end of the return movement of said pointers toward their zero position, said detent operating to hold said pointers in their zero position.

18. In a machine of the class described, the combination of a housing, a roller rotatably mounted in said housing and across which the goods pass in being measured, a presser roller to coöperate with said first named roller, mechanism driven by said first named roller for measuring the quantity of goods passed between said rollers, means for normally holding said presser roller away from said first named roller, a cutting blade mounted on said housing for marking the edge of the goods to indicate the line on which the same is to be severed, and a finger plate mounted on said housing in alinement with said blade for releasing said presser roller to permit the same to move into contact with said first named roller.

19. In a cloth measuring machine, the combination of a rotary member adapted to be actuated by the goods when passed thereover, indicating mechanism driven by said rotary member including a pointer driven so as to make continuous successive revolutions during the indicating movement, a disk rotating with the indicating mechanism and moving in unison with said pointer, means for returning said disk and pointer to their zero positions, a detent adjacent said disk, said disk having means for coöperating with said detent to arrest the disk at its zero position at the end of the return movement, and means controlled by said indicating mechanism for actuating said detent to engage said disk and arrest the pointer when the indicating mechanism arrives at its zero position in its return movement.

20. In a cloth measuring machine, the combination of a rotary member adapted to be actuated by the goods when passed thereover, indicating mechanism driven by said rotary member, a stop device for stopping the rotary member actuated by the indicating mechanism when the same reaches the limit of its indicating movement, means for disconnecting the indicating mechanism from said rotary member to permit the same to be returned to its zero position, means for returning the indicating mechanism to its zero position, and means for stopping the indicating mechanism at its zero position.

21. In a cloth measuring machine, the combination of a rotary member mounted so as to be actuated by the movement of the goods thereover, indicating mechanism including a dial and a pointer movable on said dial, mechanism driven by said rotary member for driving said pointer, and means controlled by said last named mechanism for arresting the rotation of said rotary member when said pointer has made one revolution on said dial.

22. In a cloth measuring machine, the combination of a rotary member adapted to be actuated by the goods when passed thereover, indicating mechanism driven by said rotary member, a controller wheel mounted to rotate with the indicating mechanism, stop mechanism for arresting the rotary member, means for normally holding the said stop mechanism out of engagement with the rotary member to permit the free rotation of the rotary member, a finger, and means actuated thereby for actuating said stop mechanism to stop the rotary member, a dog on said controller wheel to engage one side of said finger when said indicating mechanism has substantially reached the limit of its indicating movement, and thereby effect the arrest of the rotary member, means manually operable at will for disconnecting the rotary member from said indicating mechanism to permit the return of the indicating mechanism to its zero position, means for returning the indicating mechanism to its zero position, a wheel also rotating with the indicating mechanism, and having a shoulder thereon, a detent to coöperate with said shoulder to stop the return movement of the indicating mechanism in the zero position, a spring normally holding said detent out of the path of said shoulder, said detent being connected with said finger whereby said dog engaging said finger at the end of the return movement of the indicating mechanism moves said detent into the path of said shoulder to stop the return movement.

23. In a cloth measuring machine, the combination of a measuring roller adapted to be actuated by the goods when passed thereover, indicating mechanism driven by said measuring roller and including a fast moving pointer adapted to make continuous successive revolutions and a slow moving pointer adapted to make a single revolution, a controller wheel moving at the same speed as said slow moving pointer, a disk moving in unison with said fast moving pointer, means for returning the indicating mechanism to the zero position after an indicating movement, a finger actuated by said controller wheel when said controller wheel is arriving at its zero position in its return movement, and means actuated by said finger for stopping said disk to arrest said fast moving pointer in its zero position.

24. In a machine of the class described, the combination of a wheel mounted to make successive revolutions, a second wheel mounted to be rotated through a partial revolution at each revolution of said first named wheel, indicating means controlled by said wheels, means for returning said wheels to their zero position, a detent adjacent said first named wheel, said first named wheel having a coöperating part normally engaging said detent to stop said first named wheel in its zero position but permitting forward rotation of said first named wheel, and means for controlling said detent by said second named wheel to shift said detent into the path of said coöperating part to stop said first named wheel in its zero position.

25. In a machine of the class described, the combination of a support for the cloth, a holding strip secured at one end to said support to extend over the cloth lying on said support, a carriage guided along said support and operating to press said holding strip down onto the cloth, and a knife mounted on said carriage for cutting the cloth.

26. In a machine of the class described, the combination of a support for the cloth, cloth holding means in the form of a resilient strip attached adjacent to one end to said support and tending to hold itself in an elevated position above the cloth on the support, a carriage guided along said support and operating to press said strip down onto the cloth, and a knife mounted on said carriage for cutting the cloth.

27. In a machine of the class described, the combination of a support for the cloth, cloth holding means in the form of a strip secured at one end to said support and extending over the cloth lying on said support, said strip having a longitudinal slot therein, a carriage guided on said support and operating to press said strip down onto the cloth, and a knife mounted on said carriage and extending through said slot for cutting the cloth.

28. In a machine of the class described, the combination of a cloth support in the form of a rail, cloth holding means in the form of a strip attached adjacent one end to said rail, to extend over the cloth lying on said rail, a carriage mounted to slide along said rail, and a knife mounted on said carriage and guided along said strip for cutting the cloth.

In testimony whereof I hereunto affix my signature in the presence of two witnesses, this 18th day of March, 1915.

WALTER E. HOSCH.

Witnesses:
M. P. SMITH,
M. A. HANDEL.